(12) United States Patent
Coplen

(10) Patent No.: US 11,408,536 B1
(45) Date of Patent: Aug. 9, 2022

(54) VARIABLE RATIO SHOWER MIXING VALVE ACTUATOR

(71) Applicant: Jack Coplen, Folsom, CA (US)

(72) Inventor: Jack Coplen, Folsom, CA (US)

( * ) Notice: Subject to any disclaimer, the term of this patent is extended or adjusted under 35 U.S.C. 154(b) by 409 days.

(21) Appl. No.: 16/554,513

(22) Filed: Aug. 28, 2019

(51) Int. Cl.
*F16K 31/60* (2006.01)
*F16K 31/53* (2006.01)
*F16H 3/00* (2006.01)
*F16H 3/02* (2006.01)

(52) U.S. Cl.
CPC ............. *F16K 31/605* (2013.01); *F16H 3/02* (2013.01); *F16K 31/53* (2013.01)

(58) Field of Classification Search
CPC .......... F16K 31/605; F16K 31/53; F16H 3/02; Y10T 137/9464; E03C 1/0409; E03C 1/041; E03C 1/0412
See application file for complete search history.

(56) References Cited

U.S. PATENT DOCUMENTS

| | | | | |
|---|---|---|---|---|
| 1,379,025 A * | 5/1921 | Jones | ............... | F16K 11/202 137/635 |
| 1,641,561 A * | 9/1927 | Whidden | ............... | F16K 11/18 137/636.3 |
| 4,901,915 A | 2/1990 | Sakakibara | | |
| 5,035,262 A * | 7/1991 | Schweikert | ......... | B01F 15/0429 137/607 |
| 8,869,835 B1* | 10/2014 | Sapp | ............... | F23K 5/007 137/637 |
| 9,581,255 B2 | 2/2017 | Zieger et al. | | |
| 2005/0076960 A1* | 4/2005 | Luig | ............... | F16K 11/202 137/606 |
| 2015/0219225 A1* | 8/2015 | Zieger | ............... | B05B 1/1645 137/625.41 |

\* cited by examiner

*Primary Examiner* — Marina A Tietjen

(57) ABSTRACT

The present invention is a variable ratio shower mixing valve actuator. The system provides distinct advantages over existing shower valve actuators. The primary advantage is that the system allows a user to adjust the magnitude of the effect that a given actuation lever input will have on the output flow.

6 Claims, 5 Drawing Sheets

VARIABLE RATIO SHOWER MIXING VALVE ACTUATOR

FIELD OF THE DISCLOSURE

The overall field of invention is systems and methods related to shower mixing valve actuation.

BACKGROUND

This invention relates generally to shower mixing valve actuation, and particularly to devices and methods for varying shower mixing valve actuation in relation to user input at the valve actuation lever.

Shower mixing valves are a well-developed technology that provide users the ability to mix a cold water flow with a hot water flow in order to achieve a desired mixed output temperature. In single actuation designs, a user is able to rotate a lever or handle that is directly attached to the mixing valve. In this type of design, a valve is generally left in a closed state while the shower is not in use. To operate the shower, a user will rotate the actuation lever through its throw. The beginning stage of the throw will initiate full flow of the cold input through the valve and no flow of hot water through the valve, resulting in output that is fully cold. As the user continues to rotate the lever through its throw, the mixing valve operates to reduce the proportion of cold water that is allowed to flow through the valve, while simultaneously increasing the proportion of hot water that is allowed to flow through the valve. At the far end of the lever throw, therefore, the valve allows full flow of the hot input and no flow of the cold input, resulting in output that is fully hot. At intermediate positions between the fully cold and fully hot positions, the valve will be actuated such that a mixture of cold and hot flows are combined to produce an output flow having a temperature between that of the cold input flow and hot input flow, with the resultant output flow temperature being generally related to the position of the actuation lever. In other words, the output temperature is continuously adjustable by a user through the actuation lever position.

In dual actuation designs, a shower mixing valve may have the ability to control flow and mixing ratio independently. In this type of design, which is also common, the lever rotates on two axes. Typically, the first axis, normal to the shower wall, controls mixing ratio, similar to the single actuation design. The second axis is parallel to the plane of the wall, and allows the lever to be rotated away from the wall, or back toward it. When the lever is rotated such that it is pressed toward the wall to the furthest extent, the flow is off. A user will initiate flow by pulling the lever away from the wall. As the lever moves further from the wall, flow will increase.

Single and dual actuation shower mixing valves may be referred to as pressure balancing or temperature balancing valves, respectively, though the present invention is applicable to virtually all mixing valves that modulate temperature through a rotary motion.

A design feature that is inherent to most shower mixing valves is that the valve has a cylindrical core that operates to mix the inputs according to the core's rotational position. A typical shower mixing valve has an actuation lever that is attached in fixed relation to the valve core. Therefore, a typical shower valve actuator is operable such that the full range of valve actuation and related output temperature is achieved through actuating the lever through one rotation or less.

While the output temperature is continuously adjustable by a user, practical issues related to temperature selection are common. Often, the temperature differential between the cold and hot input flows are substantial, and the result is that a small amount of actuation at the actuation lever will result in large changes in output temperature. Additionally, the construction of shower mixing valves often causes mixing proportions to change in amounts that are difficult to predict by a user, such that large amounts of actuation in certain portions of the lever throw will result in small output temperature change, while small amounts of actuation in other portions of the lever throw will result in large output temperature change. Furthermore, many shower users are highly sensitive to small differences in output temperature, so proper mixing proportions are very important. These factors combine to the effect that often shower users have difficulty adjusting the actuation lever throw to a position that will produce an output flow of a desired temperature. For example, if the user perceives that the output is slightly too cold, often the amount of actuation that is required to produce a desirable output temperature is difficult to predict or even difficult to physically achieve, as the amount of actuation that would be required to correct the temperature may be very small. This problem may be compounded by the fact that the dexterity that is required to achieve such minute adjustments of the actuation lever may not be possessed by some users. Users having reduced dexterity often have great difficulty operating shower valves to produce a desirable output temperature.

Additionally, typically large portions of the possible temperature range that are possible are not desirable for showering. For example, it is not uncommon for a typical user to only be able to tolerate output mixtures that are 85-95% hot, so while the valve may be capable of adjusting between 0-100% hot, a user may only actually use 10% of the adjustment range as a practical matter.

Finally, it is undesirable for a valve actuation lever to have a throw that is excessively long. For example, it would be inconvenient for a user if a valve actuator required 20 full rotations of the actuation lever to move through the full range of temperatures. In general, it is desirable to actuate a shower valve using an actuation lever that requires minimal throw while still providing users the ability to accurately and predictably adjust the shower output temperature.

A need exists for a shower valve actuator that allows users to easily adjust output flow to a desired temperature. Because of the significant number of variables that affect user's ability to accurately adjust shower output temperature, a need exists for a device that allows users to alter the amount of mixing valve actuation that occurs for a given amount of actuation lever throw.

SUMMARY

The disclosure presented herein relates to a variable ratio shower mixing valve actuator. In some embodiments, the preceding and following embodiments and descriptions are for illustrative purposes only and are not intended to limit the scope of this disclosure. Other aspects and advantages of this disclosure will become apparent from the following detailed description.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present invention is a variable ratio shower mixing valve actuator. The system provides distinct advantages over existing shower valve actuators. The primary advantage is that the system allows a user to adjust the magnitude of the effect that a given actuation lever input will have on the output flow, or Actuation Ratio. In an embodiment, a user is able to manually select a preferred Actuation Ratio. In alternative embodiments, a user may select desired hot and cold limits, which would have a related effect of automatically selecting a suitable Actuation Ratio.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Figure 1:
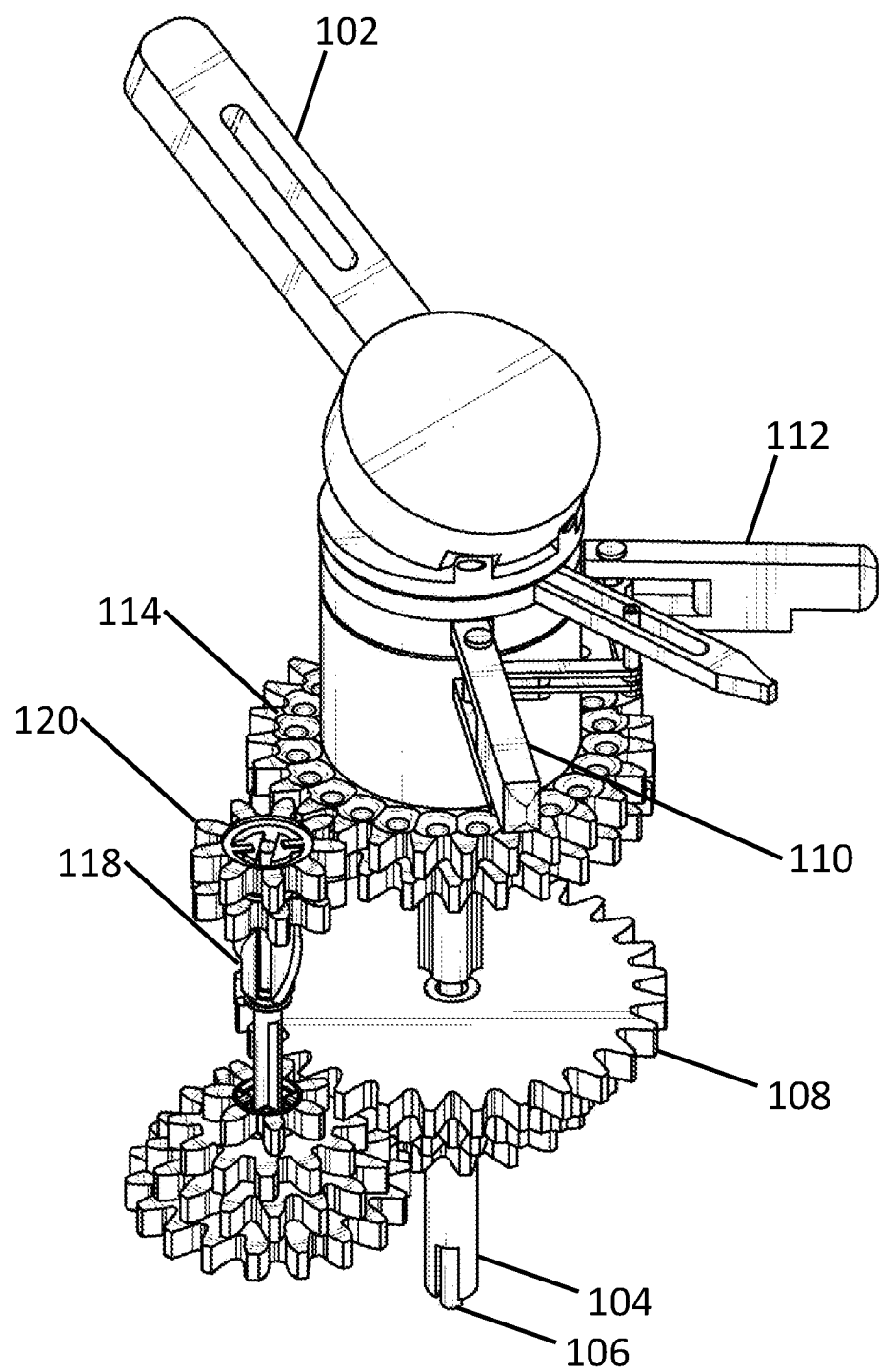
FIG. 1 is perspective view of the preferred embodiment of the shower mixing valve actuator.

FIG. 1 is a perspective view of the preferred embodiment of the shower valve actuator showing the control levers and internal mechanisms. In the embodiment, the mixing valve core (not shown) is a dual actuation type valve wherein an input lever 102 operates to modulate temperature through rotation about the central axis and modulates flow rate through lifting the lever away from the face of the device. Actuation of the valve core is produced through angular displacement of the reduction output shaft 104 for temperature adjustment and longitudinal displacement of flow control actuation shaft 106. The reduction output shaft and the flow control actuation shaft are arranged coaxially. The flow control actuation shaft is directly attached to the actuation lever 102, while the reduction output shaft motion flows through one of several parallel reduction gears 108.

The preferred embodiment includes mechanical cold 110 and hot 112 temperature limit levers. The levers rotate about the same central axis as the main lever 102 and serve to provide mechanical limits for the mixing valve such that it will operate within a defined mixture range. The temperature limiting levers 110 and 112 have rotational detents 114, and in the preferred embodiment, their rotations are indexed at 15 degree increments such that the angle between the two levers 110 and 112, or Temperature Range Angle, will be either 15, 30, 45, or 60 degrees of angular rotation. The angle between the two levers would define the temperature range that the actuator would control. In alternative embodiments, the angular indices may be at angles other than 15 degrees. A gear selector mechanism 120 within the actuator operates to adjust the actuation ratio based on the angle between the two levers. The particular mechanics by which the limiting levers operate to limit temperature is beyond the scope of this disclosure.

In the embodiment, four actuation ratios are present, and each actuation ratio corresponds to a Temperature Range Angle. In the embodiment, if the Temperature Range Angle is 15 degrees of angular rotation, the actuation ratio would be the highest gear reduction ratio, such that large inputs at the actuation lever would produce small changes in output temperature at the mixing valve. While if the Temperature Range Angle is 60 degrees, the actuation ratio would be the smallest gear reduction ratio, such that large inputs at the actuation lever would produce large changes in output temperature at the mixing valve. Temperature Range Angles of 30 and 45 would each have corresponding gear reduction ratios that would correspond to an appropriate modulation ratio between the Actuation Lever and output temperature.

In traditional shower mixing valves, the lever position is fixed in relation to the valve body. Therefore, the position of the lever can be used as an indication of the mixing ratio. In the present invention, the same is not necessarily true. In an embodiment, the device has a mixing ratio indicator mechanism (not shown). An arrangement of gearing operates to move a temperature indicator dial in coordination with the valve body movement. The indicator dial is part of an indicator mechanism.

Figure 2:
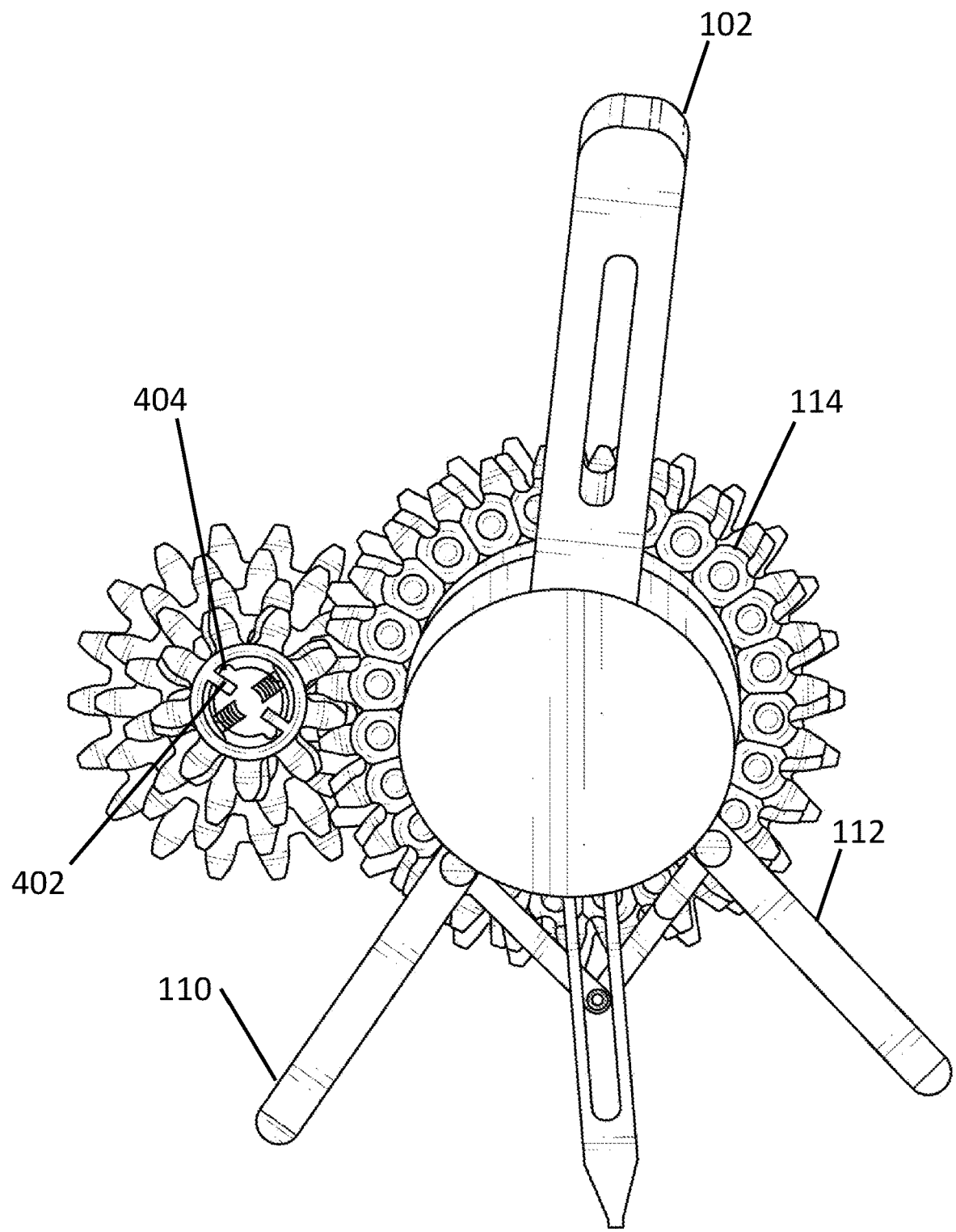
FIG. 2 is a plan view of the shower mixing valve actuator.
Figure 4:
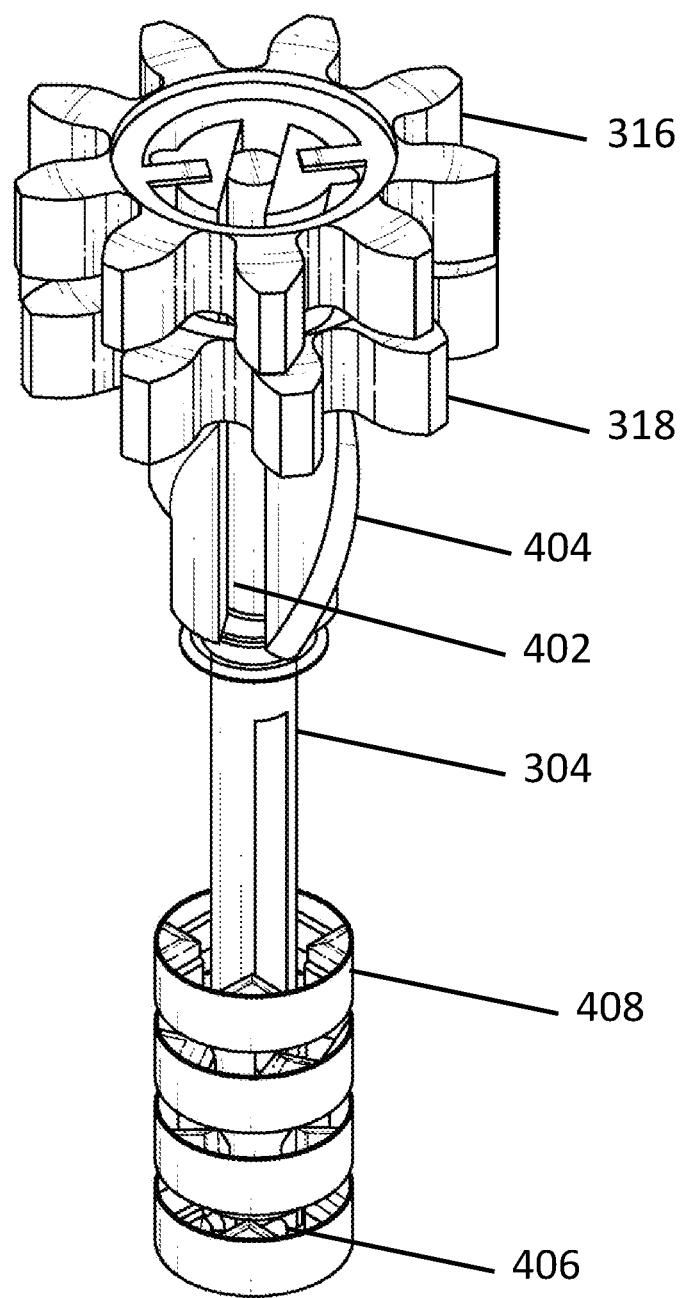
FIG. 4. is a perspective view of the gear selector mechanism.

FIG. 2 is a top view of the shower valve actuator showing alternate views of the main lever 102, cold 110 and hot 112 temperature limit levers, rotational detents 114, and linear 402 and helical 404 spines-sets discussed and detailed in FIG. 4.

Figure 3:
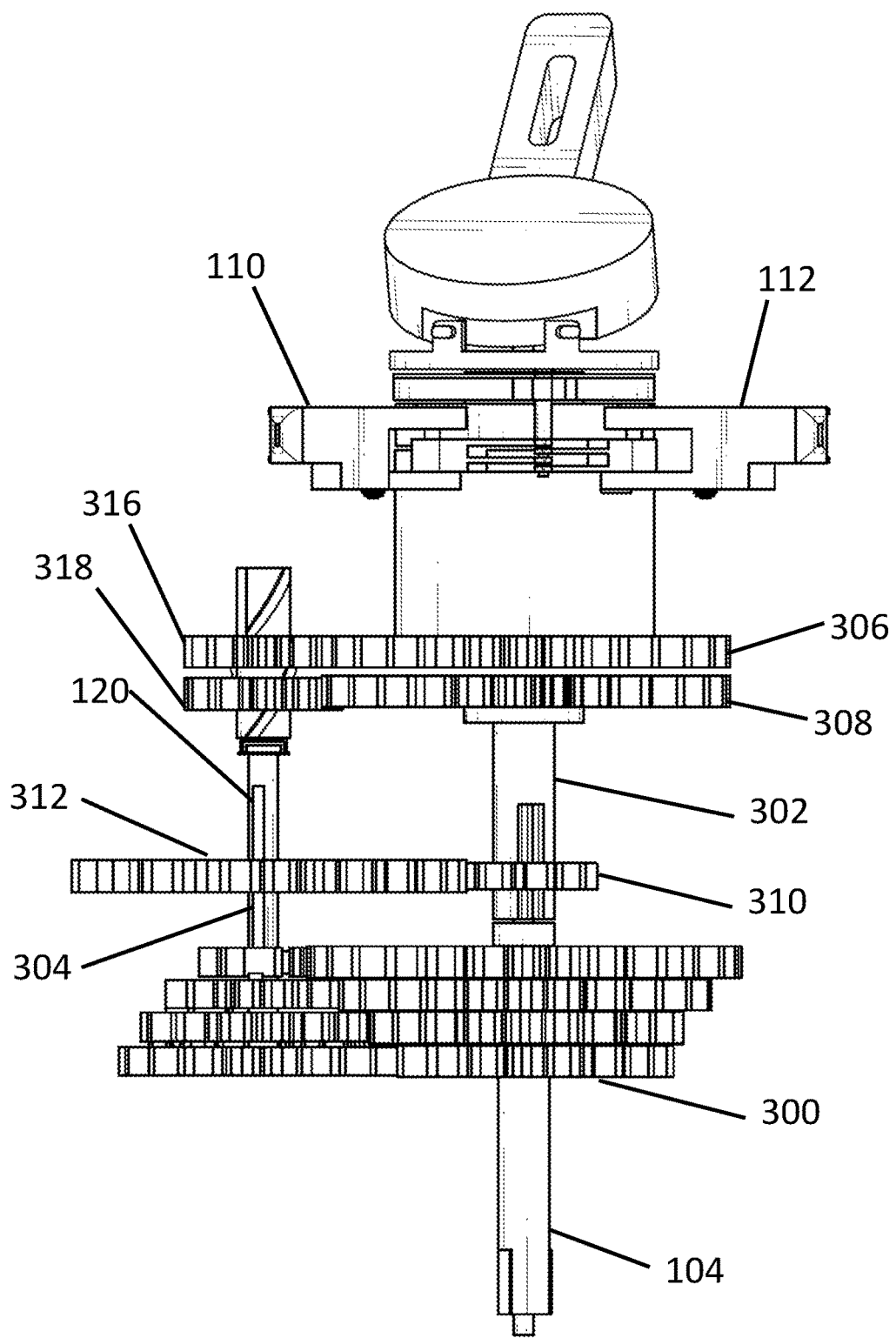
FIG. 3 is a side view of the shower mixing valve actuator.

FIG. 3 is a side view of the internals of the shower valve actuator showing the gear selector mechanism 120 and the gear reducing mechanism 300. The gear reducing mechanism has an input shaft 302, an intermediate selector shaft within the gear selector mechanism 304, and an output shaft 104.

The input shaft 302 and the entire input mechanism rotates in fixed relation to the actuation lever 102. Riding on the input shaft are a hot limit gear 306 and a cold limit gear 308. The hot limit gear 306 is rigidly fixed to the hot limit selector 112 and the cold limit gear 308 is rigidly fixed to the cold limit selector 110. The hot 306 and cold 308 limit gears are in constant mesh with corresponding first 316 and second 318 spur gears in the gear selector mechanism 304.

The input shaft 302 has a rigid or splined connection that directly drives an input spur gear 310, which meshes with and drives an intermediate spur gear 312 that is rotationally fixed to the intermediate shaft.

FIG. 4 is an isolated view of the selector mechanism 120. The first 316 and second 318 spur gears together control the angular and longitudinal position of the intermediate selector shaft 304. The selector shaft 304 interacts through a pair of spline-sets, wherein the first spline-set 402 is linear and the second spline-set is helical 404. The first gear 316 meshes with the intermediate shaft 304 by means of the first linear spline-set 402, and therefore the intermediate shaft can translate longitudinally with respect to the first gear 316. The second gear 318 meshes with the intermediate shaft by means of the second helical spline-set 404, and therefore the intermediate shaft can translate helically with respect to the second gear 318. Therefore, when the first 316 and second 318 gear rotate in unison, the effect is that the intermediate shaft 304 translates in pure angular motion. If the first 316 and second 318 gear rotate not in unison, i.e. rotate with respect to one another, the effect is that the intermediate shaft will translate longitudinally.

The intermediate shaft has an output spline 406 that is of sufficient size to interact with one, and only one, of any of the selector input gear spline-sets 408, each associated with a different reduction gear ratio. Therefore, the longitudinal position of the intermediate shaft 304 will dictate which reduction gear ratio is operative, while the angular position of the intermediate shaft will dictate the angular position of the output shaft 104.

Therefore, in the preferred embodiment, the angle between the hot and cold limit lever will dictate the reduction ratio.

Figure 5:
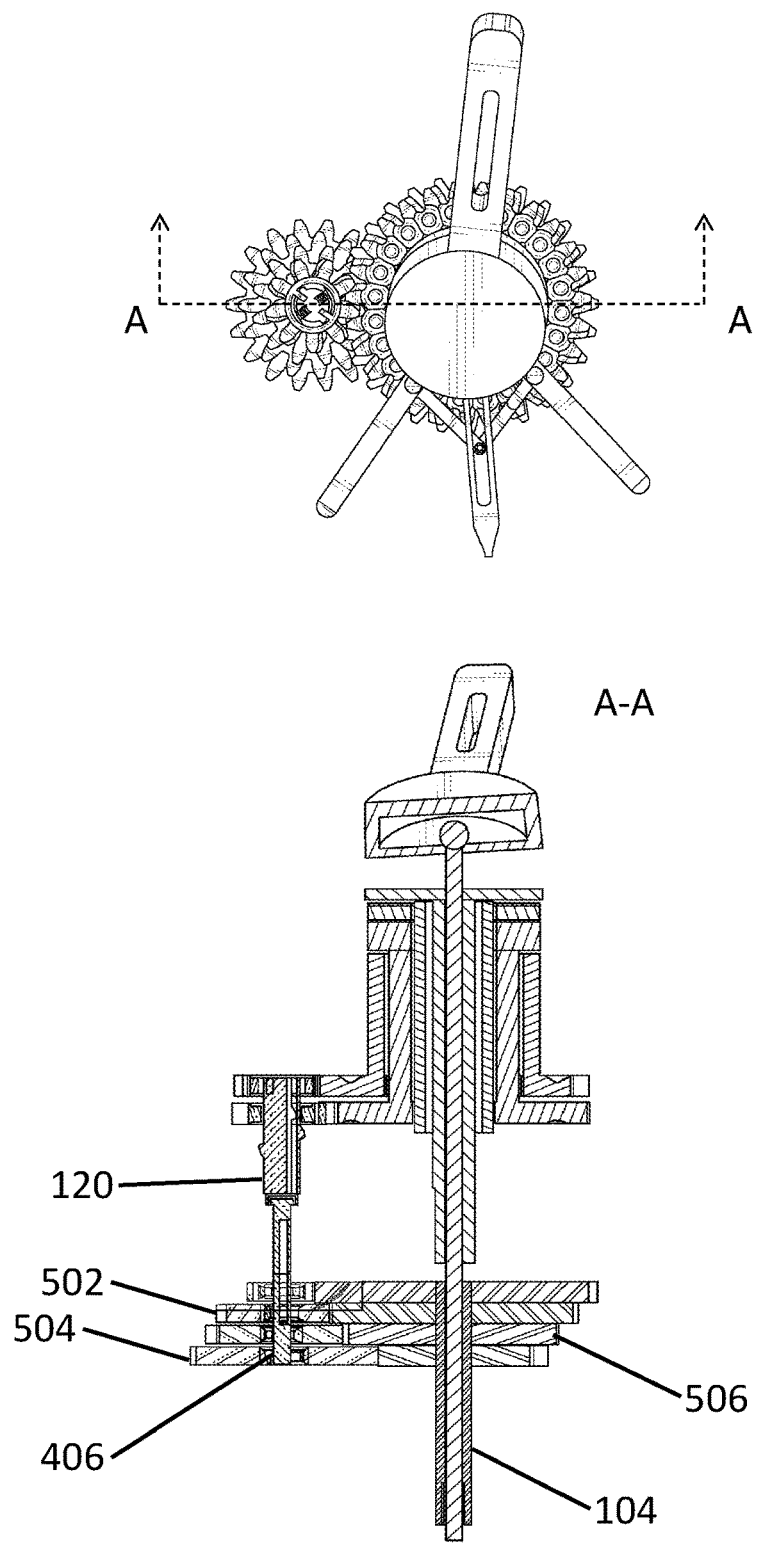
FIG. 5 is a side section view of the shower mixing valve actuator.

FIG. 5 shows a section view of the device. In the preferred embodiment of the device, the reduction selector 120 includes four reduction gear pairs 502. Each of the reduction pair gears operate in a constant-mesh arrangement, wherein the gears of the intermediate shaft 504 are each constantly enmeshed with their corresponding gears on the output shaft 506. Furthermore, each of the output shaft gears are rigidly fixed to the output shaft 104, while the intermediate shaft gears 504 are free to rotate on the intermediate shaft unless the output spline 406 is engaged with a particular gear, which engages that particular gear to rotate in substantially fixed relation to the intermediate shaft. In the preferred embodiment, the position of the output spline dictates which of the reduction ratios is active. A user may select the active gear through the selector mechanism.

In the preferred embodiment, the gear selector mechanism provides gear reduction that ranges from 1:1, such that the input and output shaft move in substantially fixed relation, to 4:1, such that motion at the input shaft 302 is reduced by a factor of four at the output shaft 104. In the preferred embodiment, intermediate reductions, such at 2:1 and 3:1 are provided by gear reduction mechanism as well. In alternative embodiments, the number or reduction values of the reduction gear pairs 502 may be modified to suit user preferences or mixing valve mechanics.

In the preferred embodiment, the particular gear reduction is selected via the relative positions of the hot and cold limit selectors. In alternative embodiments, alterative means for gear reduction selection may be desirable. In an embodiment, a user may operate the intermediate shaft position directly via a secondary control.

In an embodiment the device includes a mechanism to select between either the gear-reduced operation function or a direct-drive function in which the handle operates in a 1:1 ratio with respect to the valve core. In an embodiment, the direct drive function is achieved by actuating the input spur gear 310 along the input shaft 302, such that the input spur gear disengages from the intermediate spur gear 312, and an alternative means for directly coupling the input shaft 302 and output shaft 104 circumvents the reduction mechanism, with the effect being that the input handle operates in fixed relation to the output shaft.

While preferred and alternate embodiments have been illustrated and described, as noted above, many changes can be made without departing from the spirit and scope of the invention. Accordingly, the scope of the invention is not limited by the disclosure of these preferred and alternate embodiments. Instead, the scope of the invention should be determined entirely by reference to the claims. Insofar as the description above and the accompanying drawings disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶6. In particular, the use of "step of" in the claims herein is not intended to invoke the provisions of U.S.C. § 112 ¶6.

I claim:

1. A variable reduction shower mixing valve actuator comprising:
 an input lever mated to a gear reduction mechanism having a plurality of gear reduction ratios, a gear selector mechanism that is operable to control the gear reduction mechanism and said plurality of gear reduction ratios, wherein at most one of said plurality of gear reduction ratios is active at a given time, an output shaft is angularly mated to said active ratio, and said output shaft is adapted to mate to a shower mixing valve, wherein the gear selector mechanism is indirectly controllable through the relative positions of two levers.

2. The device of claim 1 wherein the gear selector mechanism is directly controllable by a lever.

3. The device of claim 1 wherein the shower mixing valve is a single actuation design.

4. The device of claim 1 wherein the shower mixing valve is a dual actuation design.

5. A variable reduction shower mixing valve actuator comprising:

an input lever rotatable about an input shaft, a first gear that is rotatable about said input shaft, a reduction selector mechanism comprising:

an intermediate shaft having a second gear, said second gear being enmeshed with said first gear, said second gear being angularly mated to said intermediate shaft, said intermediate shaft having an intermediate shaft output spline, a third gear, rotatable about said intermediate shaft having features adapted to engage with said intermediate shaft output spline such that when said intermediate shaft output spline is positioned to mate with said third gear, said third gear rotates in substantially fixed relation to said intermediate shaft, a fourth gear angularly mated to an output shaft, said fourth gear being enmeshed with said third gear, said third gear comprising one of a plurality of intermediate shaft gears that are rotatable about and angularly mateable to said intermediate shaft via said intermediate shaft output spline, said fourth gear comprising one of a plurality of output shaft gears that are angularly mated to said output shaft, said second, third, and fourth gears being enmeshed with said output shaft gears, and said output shaft is adapted to mate to a shower mixing valve.

6. The device of claim 5 further comprising:

a first limit lever that is rotatable about said input shaft and angularly mated to said first gear, a second limit lever that is rotatable about said input shaft and angularly mated to a fifth gear, said fifth gear being is rotatable about said input shaft, a sixth gear that is helically mated to said intermediate shaft, wherein the relative angular displacement of said first and second limit levers causes a longitudinal displacement of said intermediate shaft, and said longitudinal displacement of said intermediate shaft determines which of said intermediate shaft gears is engaged with said intermediate shaft output spline.

\* \* \* \* \*